Oct. 22, 1940.    A. E. OSBORN    2,219,053
PIPE JOINT
Filed June 11, 1938
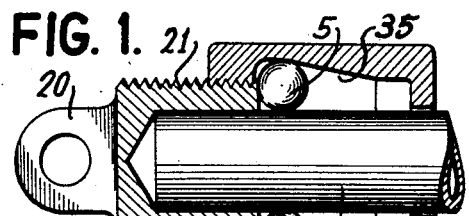
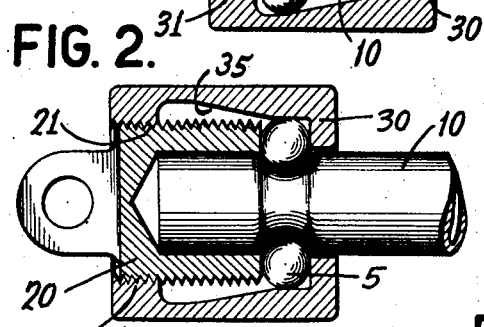
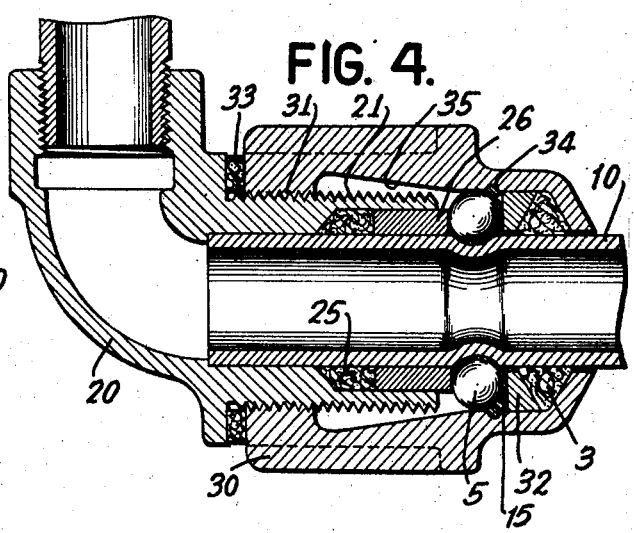
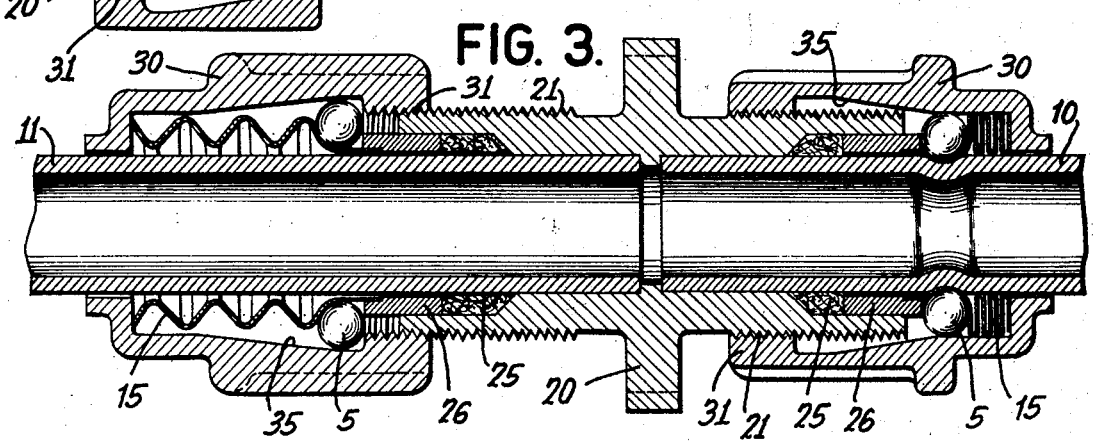
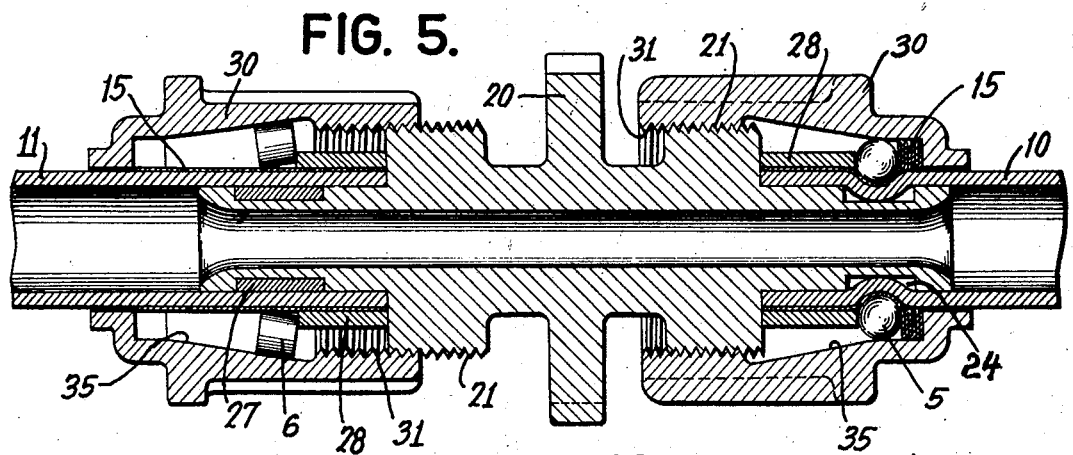
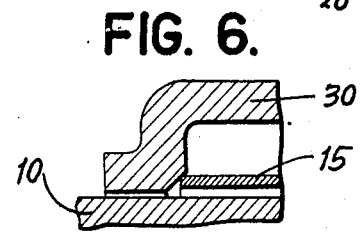
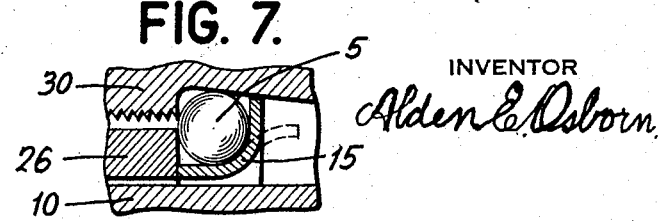
INVENTOR
Alden E. Osborn Patented Oct. 22, 1940

2,219,053

UNITED STATES PATENT OFFICE 2,219,053

PIPE JOINT

Alden E. Osborn, New York, N. Y.

Application June 11, 1938, Serial No. 213,178

4 Claims. (Cl. 285—122)

The object of my invention is to provide a pipe joint or means for connecting separate parts in which the parts to be coupled need not be threaded while at the same time they are fastened as securely as with the usual threaded connection. It also provides a means, operated by the movement of the actuating part for the fastening means, whereby the joint between the parts can be made tight against leakage as well as being rendered practically inseparable. It should be understood that, while my invention is termed a "pipe joint," this title is used because a most important use for the device is to attach pipes or tubes to fittings, and it is not intended to limit the field of its application, as it can be used in any way in which its special features are advantageous.

In the accompanying drawing several forms of my invention are illustrated. However, other modifications within the scope of the claims may be made in order to adapt my invention to various conditions and uses.

In the drawing:

Figures 1 and 2 represent longitudinal partial sectional views of my invention showing a simplified form clearly illustrating the main principle involved therein.

Figure 3 represents a longitudinal sectional view of a coupling for pipe embodying one form of my invention.

Figure 4 represents a longitudinal sectional view of a modified form of my invention applied to a pipe elbow.

Figure 5 represents a longitudinal sectional view of a pipe coupling embodying a still further modification.

Figure 6 represents a sectional view of details of certain parts embodied in my invention, and Figure 7 represents a sectional view of a modification of Figure 6.

In Figures 1 and 2, 10 represents the inner member or pipe having a plain cylindrical outer surface to which the socketed part or fitting 20 is to be fastened.

This member 20 is provided with a thread 21 on its exterior which thread meshes with an internal thread 31 on the collar 30 which collar also has an internal tapered surface 35. The balls 5 surround the inner member 10 and bear against the tapered surface 35 and the end of the member 20. These balls 5 are of such a diameter that, when they are surrounded by the larger diameter part of the tapered surface 35, the inner member 10 can be passed thru them into the socket of the member 20 while, when they are inside of the smaller diameter part of the taper, they are brought inward to a point where the inside circumference around all of the balls is smaller than the diameter of the inner member. The simple form illustrated in Figures 1 and 2 is not shown as provided with any means for retaining the balls in place with the member 10 removed. However, if as shown, no retaining means is provided the balls 5 can be inserted by first inserting the member 10 thru the collar 30 into the socket in the member 20 and passing the balls 5 between the end of the member 20 and the collar 30 before the collar is threaded onto the member.

The operation of my invention as illustrated in Figures 1 and 2 is as follows:—When the parts are in the position shown in Figure 1, with the collar 30 extended, the member 10 is inserted thru the collar 30 and into the socket in the member 20 with the balls 5 around the exterior of the member 10. The rotation thereafter of the collar in a direction to draw, thru the action of the threads, the tapered surface therein toward the member 20 causes the balls 5 to roll around the outside of the member 10. As the turning of the collar is continued, the balls roll in a spiral on the tapered surface 35 while they roll around the member 10 at practically one place with the result that a groove is rolled around the member 10 while the rolling effect on the tapered surface is relatively small because the balls move to various positions on its surface. A very high pressure is developed against the member 10 by the balls because of the threads 21 and 31 and tapered surface 35 on the collar and, by having relatively fine threads and a small taper angle, this pressure can easily be made sufficient to roll a groove around the member 10 if the member is of any ordinary unhardened material so that the final result would be that, when the parts assume the position shown in Figure 2, it would not be possible to draw the member 10 out of the member 20 without actually breaking the parts of the joint.

In Figure 3 is illustrated a type of my invention embodying the features of the form of my invention just described with additional features to render it practical as a pipe joint. It is shown in Figure 3 as a coupling for connecting the pipe 10 to the pipe 11 and comprises the fitting 20, the collars 30, and the balls 5, all of which correspond to the similarly designated parts of Figures 1 and 2. In addition to these parts there is provided at each end, in order to make the device practical for coupling pipe, a packing compressing sleeve 26, a packing 25 of any suitable material, and a corrugated ball retaining sleeve 15. In attaching this form of my invention to the pipe, the pipe is simply inserted into position and the collar 30 turned in a direction to screw it further onto the fitting 20 with the result that the balls roll against the taper and around the pipe as described in connection with Figures 1 and 2, excepting that the ball retainer 15 would also be rolled into the pipe groove. In this form of my invention, in addition to rolling the pipe groove, the balls 5 would press the packing gland sleeve 26 against the packing 25 and compress the packing against the outside of the pipe, thus, not only adding to the firmness with which the pipe is held in place, but also forming a tight joint and preventing leakage. It will be noticed that, when the joint is finally tightened as it is shown at the pipe 10 end, most of the retainer 15 is crushed between the balls 5 and the inside of the flange at the end of the collar 30 and that the pressure is transmitted directly from this flange thru the crushed part of the retainer and balls to the packing gland sleeve 26 thus making it possible to put a very heavy pressure on the packing 25.

When a joint of this kind is used in a location where conditions likely to cause rust are absent no particular protection against rusting of its interior parts need be provided. However, when it is to be located underground or in water and, if it is not practical or too costly to make its interior parts of rust proof materials, one method of preventing deterioration would be to enclose within the collar space and surrounding the balls, a small amount of non-hardening rust-proof putty-like material that would, when the joint is being tightened, squeeze into any openings and seal them against the admission of water or other deleterious substances. Another method which would seal the opening between the pipe and collar, is to make the retainer 15 with corrugations of such depth that when they are flattened between the balls 5 and the flange of the collar 30, the retainer would be tight against both the pipe and the inside of the collar.

A further method of protecting the inner parts is illustrated in Figure 4 which also shows my invention with an elbow type of fitting. In this figure the collar 30 is provided with a packing space and a sleeve or washer 32 which is held in the collar by a ring 34 snapped into a groove in the collar. The packing 3 is preferably preformed so that the pipe can be passed thru it while it is in the packing space and before the joint would be tightened. When this joint is tightened the balls 5 finally press against the gland washer 32 and compress the packing 3 into contact with the pipe 10. As, under extreme conditions, moisture might enter the joint thru the threads, I have shown, in order to prevent this, a washer 33 on the fitting 20 so that the collar 30, when finally tightened, will come up tight against this washer. In this figure a retainer 15 for the balls 5 is illustrated. This retainer is more particularly shown in Figure 7 and is hereinafter described more at length.

In Figure 5 a further modification of my pipe joining device is illustrated applied to a coupling. In this form of my invention the fitting 20 is provided with ends that project into the pipes and may be arranged with circumferential grooves of which only one, 24, is shown adjacent the pipe 10, while another, 27, is shown adjacent the pipe 11. The collar and ball mechanism is similar to that shown in the preceding figures except that the sleeves 28 are provided for positioning the balls 5, and the retainer 15 is a thin piece of tubing that can be readily deformed or crushed when tightening the joint. The action in tightening this joint is the same as that of the previously described forms and when finally tightened, as shown at the pipe 10 end, a groove is rolled around the pipe. This groove in the pipe 10 holds the pipe from movement and also, in the form of my invention shown in this Figure 5, serves the purpose of rendering the joint tight against leakage by contracting the pipe against the outside of the projecting end of the fitting 20. If the projecting end of the fitting is, as shown, grooved, the pipe will, moreover, not only be held by the balls 5, but will also be held on the inside by its engagement with the groove. If desired, the groove may, as shown at the pipe 11 end, be filled with a packing material 27 that will, when the pipe 11 is contracted, make the joint extremely tight. It will be noticed that, at this pipe 11 end of Figure 5, rollers 6 are used in place of the balls 5 of the other forms, and it should be understood that balls or rollers can be used interchangeably. The retaining tube 15 shown in the Figure 5 form would be crushed as the collar 30 is turned to tighten the joint or, if desired, the tube may be arranged, as shown in the enlarged detailed view Figure 6, so that it would be pushed thru the clearance between the flange of the collar 30 and the pipe. The clearance could be made such that the retainer tube would fit tightly between the collar flange and pipe and thus make the fitting tight at this point. Still another form of retainer suitable for this Figure 5 or other forms of my invention is shown in Figure 7. This comprises a ring 15 of L section which is provided with fingers or serrations on its outer edge. These projections are, when the retainer is inserted into the tapered part of the collar 30, bent as shown by the dotted lines and are straightened to their normal position after the balls have been inserted into the collar between the tapered surface thereof and the retainer.

It should be understood that, while in the appended claims, balls are specified as the direct means for contracting the pipe, rollers may be substituted for them if desired.

I claim:

1. A means for joining an open-ended member having an externally threaded surface and a member having a cylindrical portion adapted to enter said open-ended member, comprising a collar having an internal tapered surface and surrounding said open-end of said open-ended member and said cylindrical portion of said second mentioned member and having an internal thread meshing with said external thread, and balls within said collar and arranged to bear against said tapered surface therein and said cylindrical portion of said second mentioned member, whereby, when said collar is rotated to move same longitudinally by the action of said threads said balls are rotated and moved around and along said tapered surface to the smaller diameter thereof and are also rotated against said cylindrical portion of said second mentioned member to contract said balls about said portion and reduce the circumference thereof, at the contact point of said balls.

2. A means for joining an open-ended member and a member having a cylindrical portion adapted to enter said open-ended member, comprising a collar having an internal tapered surface, balls within said collar and arranged to bear against said tapered surface therein and said cylindrical portion of said second mentioned member, and coacting threads on said open-ended member and said collar, a packing means within said open-ended member and adapted to bear against said cylindrical portion of said second mentioned member, and a longitudinally movable sleeve acting on said packing means, whereby, when said collar is rotated to move same longitudinally, by the action of said threads, said balls are rotated and moved around and along said tapered surface to the smaller diameter thereof and are also rotated against said cylindrical portion of said second mentioned member to contract said balls about said portion and reduce the circumference thereof at the contact point of said balls and to longitudinally move said sleeve to compress said packing forcibly against said cylindrical portion of said member.

3. A means for joining a member to a second member having a cylindrical portion, comprising a collar having an internal tapered surface, balls within said collar and arranged to bear against said tapered surface therein and said cylindrical portion of said second mentioned member, and coacting threads on said first mentioned member and said collar, whereby, when said collar is rotated to move same longitudinally by the action of said threads, said balls are rotated and moved around and along said tapered surface to the smaller diameter thereof and are also rotated against said cylindrical portion of said second mentioned member to contract said balls about said portion and reduce the circumference of said portion thereof at the contact point of said balls.

4. A means for joining a member to a second member having a cylindrical portion, comprising a collar having an internal tapered surface, balls within said collar and arranged to bear against said tapered surface therein and said cylindrical portion of said second mentioned member, and coacting threads on said first mentioned member and said collar, whereby, when said collar is rotated to move same longitudinally by the action of said threads, said balls are rotated and moved around and along said tapered surface to the smaller diameter thereof and are also rotated against said cylindrical portion of said second mentioned member to contract said balls about said portion and reduce the circumference thereof at the contact point of said balls, and means whereby said rotation of said collar also renders the joint between the first mentioned member and the second mentioned member tight against leakage.

ALDEN E. OSBORN.